US012333319B2

United States Patent
Gadd

(10) Patent No.: US 12,333,319 B2
(45) Date of Patent: Jun. 17, 2025

(54) TRACING JUST-IN-TIME WASM COMPILER

(71) Applicant: MICROSOFT TECHNOLOGY LICENSING, LLC., Redmond, WA (US)

(72) Inventor: Katelyn Tera Gadd, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 133 days.

(21) Appl. No.: 18/129,782

(22) Filed: Mar. 31, 2023

(65) Prior Publication Data

US 2024/0330029 A1 Oct. 3, 2024

(51) Int. Cl.
G06F 9/455 (2018.01)
(52) U.S. Cl.
CPC ........ G06F 9/4552 (2013.01); G06F 9/45508 (2013.01)
(58) Field of Classification Search
CPC .......................... G06F 9/4552; G06F 9/45508
See application file for complete search history.

(56) References Cited

U.S. PATENT DOCUMENTS

| | | | |
|---|---|---|---|
| 5,970,249 A | 10/1999 | Hoelzle et al. | |
| 5,995,754 A * | 11/1999 | Holzle | G06F 8/48 717/158 |
| 6,009,517 A | 12/1999 | Bak et al. | |
| 6,513,156 B2 | 1/2003 | Bak et al. | |
| 11,188,361 B1 * | 11/2021 | Hildenbrand | G06F 9/4552 |
| 2011/0314452 A1 * | 12/2011 | Tillmann | G06F 8/443 717/128 |
| 2012/0159193 A1 * | 6/2012 | Spradlin | G06F 21/79 713/190 |
| 2014/0237458 A1 * | 8/2014 | Elias | G06F 8/41 717/148 |
| 2014/0282431 A1 * | 9/2014 | Delio, Jr. | G06F 11/3093 717/130 |
| 2015/0169357 A1 * | 6/2015 | Busaba | G06F 9/526 711/150 |
| 2019/0114150 A1 * | 4/2019 | Ogasawara | G06F 8/4441 |
| 2019/0340103 A1 * | 11/2019 | Nelson | G06F 11/3624 |
| 2020/0241855 A1 * | 7/2020 | McCallum | G06F 8/434 |
| 2020/0341741 A1 * | 10/2020 | Brooker | G06F 11/3624 |
| 2021/0103453 A1 * | 4/2021 | Wang | G06F 9/526 |

(Continued)

OTHER PUBLICATIONS

Sansonetti, Mono and WebAssembly—Updates on Static Compilation Jan. 16, 2018 retrieved from https://www.mono-project.com/news/2018/01/16/mono-static-webassembly-compilation/ on Oct. 7, 2024 (Year: 2018).*

(Continued)

*Primary Examiner* — Lewis A Bullock, Jr.
*Assistant Examiner* — Theodore E Hebert

(57) ABSTRACT

An interpreter interacts with a tracing Just-In-Time (JIT) WebAssembly (WASM) compiler to compile frequently-executed interpreter opcodes into WASM code. The interpreter monitors the frequency of the execution of targeted locations of the interpreter opcodes of a web application to determine the most frequently executed linear sequences of the interpreter opcodes. The execution of the WASM code is monitored for execution failure before replacing the linear sequence of opcodes with an entry point opcode that immediately executes the WASM code without monitoring the execution failure of the WASM code.

20 Claims, 5 Drawing Sheets

(56) References Cited

U.S. PATENT DOCUMENTS

| | | | |
|---|---|---|---|
| 2021/0182040 A1* | 6/2021 | Tiwary | G06F 8/4434 |
| 2022/0197777 A1* | 6/2022 | Souders | G06F 11/3628 |
| 2022/0207146 A1* | 6/2022 | Rozas | G06F 21/577 |
| 2024/0143329 A1* | 5/2024 | Sun | G06F 9/30145 |

OTHER PUBLICATIONS

Rossberg, et al., "Bringing the Web Up to Speed with WebAssembly", In Journal of Communications of the ACM, vol. 61, Issue 12, Dec. 2018, pp. 107-115.

Salim, et al., "TruffleWasm: A WebAssembly Interpreter on GraalVM", In Proceedings of the 16th ACM SGIPLAN/SIGOPS International Conference on Virtual Execution Environments, Mar. 17, 2020, 13 Pages.

Smith, Will, "TraceMonkey: Trace-based Just-in-Time Compilation for JavaScript and Other Dynamic Languages", Retrieved From: https://www.cs.cornell.edu/courses/cs6120/2020fa/blog/tracemonkey/, Nov. 29, 2020, 10 Pages.

Titzer, Benl., "A Fast In-Place Interpreter for WebAssembly", In Proceedings of the ACM on Programming Languages, vol. 6, Issue OOPSLA2, Article 148, Oct. 31, 2022, 27 Pages.

* cited by examiner

TRACING JUST-IN-TIME WASM COMPILER

BACKGROUND

WebAssembly ("WASM) is a low-level representation for computer programs. The goal of WebAssembly is to be a universal compilation target for web applications written in high-level programming languages that run in a browser. It is designed for fast compilation and execution yet portable across different browsers and computer platforms. As such, the WebAssembly code is an alternative to native machine code that is compiled to run on a particular processor instruction set.

A WebAssembly binary is statically-compiled using an Ahead-of-Time (AoT) compiler and linked into a WASM executable. Typically, a computer program is translated into WASM code at build time and the WASM code is compiled by a web browser into native machine code at execution time. The AoT compilation enables a WASM executable to run fast in production environments. However, the translation of the computer program into WASM code at build time and then the compilation of the WASM code into native machine code are a burden when testing and debugging WebAssembly applications. The overhead incurred by the build and compilation phases consumes additional computing time and resources that impede testing and debugging WebAssembly applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A tracing JIT WASM compiler operates under the control of an interpreter to generate WebAssembly code for frequently-executed interpreter bytecodes of a web application that executes within a browser. The interpreter monitors the execution frequency of the interpreter opcodes and utilizes the tracing JIT WASM compiler to compile frequently-executed bytecodes into WASM code. The less-frequently executed bytecodes are executed by the interpreter and the frequently-executed bytecodes are executed as WASM code resulting in a mixed-mode of execution.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
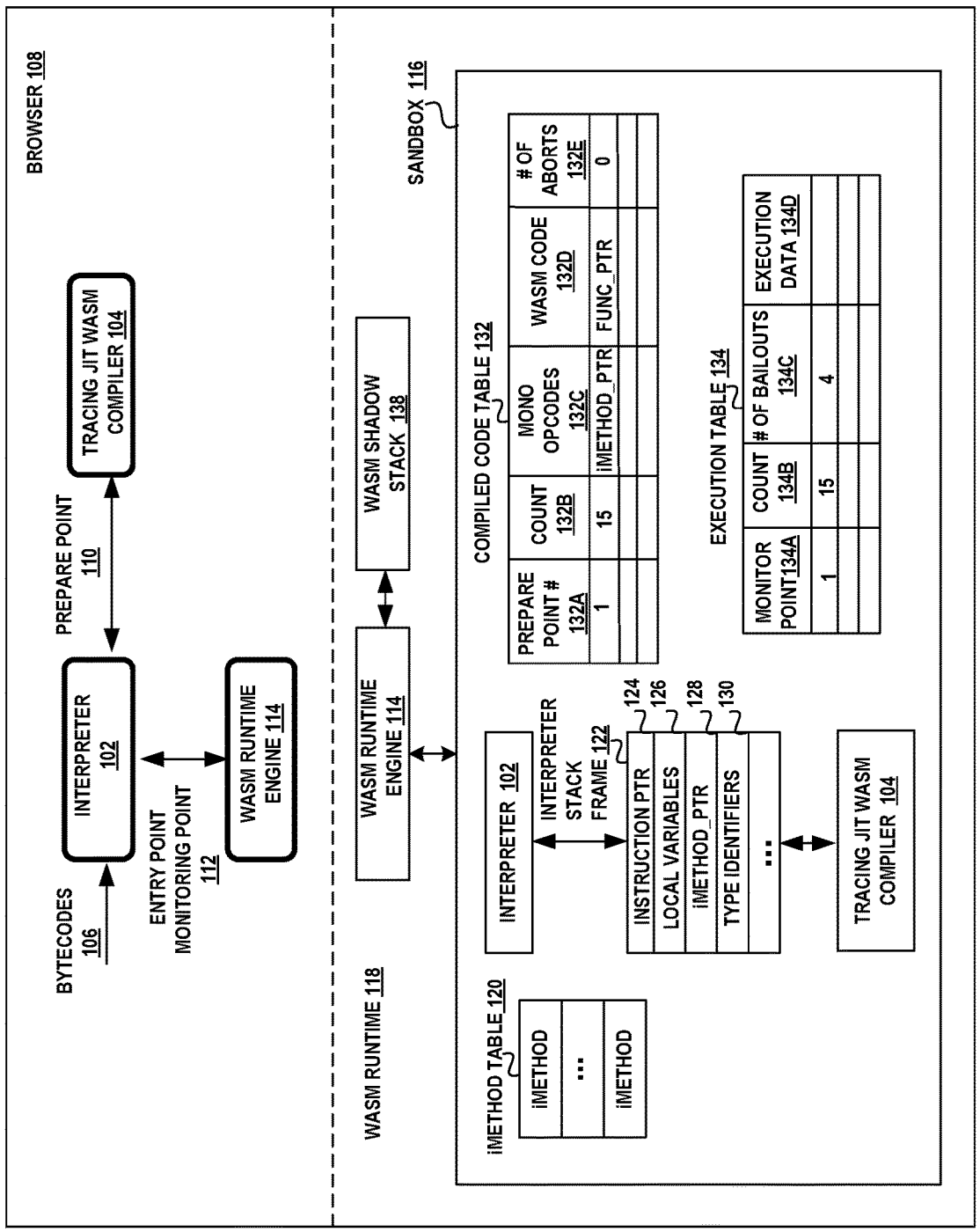
FIG. 1 is a schematic diagram illustrating an exemplary system utilizing a tracing JIT WASM compiler.

The present disclosure pertains to a tracing JIT WASM compiler that generates WebAssembly code for frequently-executed interpreter bytecodes. The tracing JIT WASM compiler is intertwined with an interpreter that executes opcodes of a web application within a browser. The interpreter monitors the execution frequency of the opcodes and utilizes the tracing JIT WASM compiler to compile frequently-executed opcodes into WASM code. The less-frequently executed opcodes are executed by the interpreter and the frequently-executed opcodes are executed as WASM code resulting in a mixed-mode of execution.

A tracing JIT WASM compiler compiles a linear sequence of frequently-executed opcodes into WASM code. The WASM code is not composed of native code (i.e., machine instructions) rather a more compact format of the interpreter opcodes that runs faster. The linear sequence of frequently-executed opcodes is considered a trace and its size is constrained by the browser making it difficult at times to fit all of a method's opcodes into a trace.

Interpreters are advantageous since they start up fast without requiring compilation into native machine code. Interpreters typically use less memory than a compiler since the opcodes are more compact than machine code. Debugging is easier within an interpreter since the interpreter can be stopped and its program state inspected, altered and resumed. The tracing JIT WASM compiler consumes time and memory to produce code that executes faster than the interpreted opcode. Hence, the compilation process has to be fast and memory efficient. To achieve these goals, the interpreter monitors the execution of the interpreter opcodes during runtime to determine the frequently-executed opcodes or hot traces of a particular length that should be compiled into a trace or WASM code. Thereafter, the interpreter continually monitors the execution of the WASM code for failure in order to ensure that the execution remains fast.

The interpreter places prepare_point opcodes at ideal locations to monitor the execution frequency of the opcodes following the prepare_point opcode. Heuristics, runtime statistics, and analysis tools are used to determine these ideal locations. The tracing JIT WASM compiler is kept simple by excluding operations with a complex behavior that would require the compiler to perform multiple passes. As such, the prepare_point opcodes are placed to avoid positions within such operations as well as avoiding compiling a trace with a small number of opcodes. When the interpreter executes a prepare_point opcode often, the opcodes that follow the prepare_point are compiled into WASM code and the prepare_point is converted into a monitoring_point opcode.

When the interpreter executes a monitoring_point opcode, the WASM code is executed by the WASM runtime and the outcome of the execution is tracked and recorded. After the monitoring_point opcode is executed beyond a threshold number of times successfully, the monitoring_point opcode is replaced with an entry_point opcode which uses the runtime to execute the corresponding WASM code without monitoring the execution. When the compiled trace fails often, the trace is discarded and the opcodes are interpreted.

Attention now turns to a more detailed description of the system, method, and components used in the vulnerability detection and repair system.

System

FIG. 1 illustrates an exemplary system 100 utilizing an interpreter 102 and a tracing JIT WASM compiler 104 to compile select opcodes of a web page or application 106 in a web browser 108. The web browser 108 includes an interpreter 102, a tracing JIT WASM compiler 104, a WASM runtime 118, and a runtime engine 114.

The browser 108 receives bytecodes of each method of a web page or web application 106. The interpreter 102 converts the bytecodes of each method into interpreter opcodes recognized by the interpreter 102. The interpreter 102 executes each opcode while monitoring the usage of the opcodes for hot traces that can be compiled into WASM code. The tracing JIT WASM compiler 104 translates the frequently-occurring opcodes into WASM code at runtime.

In an aspect, the tracing JIT WASM compiler is a one-pass compiler that makes one pass through the code to generate the WASM code. In a two-pass compiler, the compiler makes two passes through the code. A first pass to used parse the code into an abstract representation from which various analyses are performed on the execution flow and variable definition and usages in the code. The first pass produces an intermediate representation of the code. In the second pass, the code is optimized using the various analyzes performed in the first pass to optimize the code and generate machine code. However, in the tracing JIT compiler a single pass is made through the opcodes with limited analysis and optimization of the opcodes.

In an aspect, the bytecodes are the Microsoft .NET Common Intermediate Language (CIL) instructions (i.e., intermediate representation) that are part of the Microsoft Common Language Runtime. The interpreter is Microsoft's Mono .NET interpreter. The interpreter 102 and the tracing JIT WASM compiler 104 operate in the .NET WASM runtime 118. However, it should be noted that the techniques described herein are not constrained to any particular intermediate representation, runtime and/or interpreter and that the techniques disclosed herein may be applied to other types of intermediate representations, language interpreters and runtime execution environments.

In an aspect, a web page or web application 106 is received by a browser 108 having .NET CIL bytecodes. The Mono .NET interpreter 102 receives the CIL bytecodes 106 and converts them into Mono opcodes (i.e., interpreter opcodes) which are then executed by the Mono .NET interpreter 102. The Mono .NET interpreter 102 and the tracing JIT WASM compiler 104 execute in a sandbox of the .NET WASM runtime 118. The Mono .NET interpreter 102 monitors the execution frequency of certain sections of the opcodes to determine which sequence of opcodes are best for compiling into WASM code. The prepare point opcode 110 is used to initiate compilation and the monitoring point opcode and the entry point opcode 112 are used to initiate execution of a trace.

The interpreter 102 and the tracing JIT WASM compiler 104 run in a sandboxed execution environment 116 where safety checks are used to restrict the execution of the interpreter, tracing JIT WASM compiler, and the WASM code to their own region of memory. The WASM runtime engine 114 configures the sandbox which includes low-level management code to enforce the WASM's memory and resource isolation policies. The WASM's memory isolation policy ensures that every call into the runtime from a sandbox does not read or write into the memory of another sandbox or runtime. The WASM's resource isolation policy restricts access from a sandbox to file system and network resources. The sandbox 116 is a contiguous memory space that is isolated from other areas of memory. The sandbox can only access resources within the sandbox. All memory accesses are dynamically checked against the memory size and out-of-bounds accesses result in an error.

The WASM code is executed by the WASM runtime engine 114 (e.g., a virtual machine) and operates as a stack machine. Each opcode instruction takes its operand values from an operand stack and pushes their results back onto the operand stack. Local variables are loaded onto the operand stack and stored back onto the operand stack.

WASM code is organized in separate functions. A function takes a set of values as parameters and returns a set of values as a result. Each function is associated with a function pointer (func_pointer) that points to the address of the WASM code of a trace.

As shown in FIG. 1, the sandbox 116 contains the interpreter 102 and the tracing JIT WASM compiler 104. The interpreter 102 converts the bytecodes of the web application into interpreter bytecodes for each method which is stored in the iMethod table 120.

The interpreter 102 utilizes an interpreter stack frame 122 containing an instruction pointer 124, local variables, 126, a method pointer of the current opcode 128, type identifiers 130, as well as other data.

The compiled code table 132 records information on the compiled code and contains an entry for each prepare_point. Each entry includes a prepare_point identifier 132A, a count of the frequency of the prepare_point usage 132B, a pointer to the associated iMethod 132C, the function pointer to the associated WASM code 132D, and the number of aborts associated with the prepare_point 132E. An abort is a compilation failure of the trace associated with the prepare point opcode.

The execution table 134 is used to track execution of each monitoring point. The execution table includes an identifier for a monitoring point 134A, a count of the number of times the monitoring point is executed by the interpreter 134B, a number of bailouts 134C, and other execution data 134D.

The ability to seamlessly transition between the tracing JIT WASM compiler and the interpreter depends on the state sharing between these components. Traces natively execute using the interpreter's internal stack frame and share its storage for local variables, the current instruction pointer, type identifiers, and other information. While this state sharing imposes overhead on the actual execution of the traces due to the additional memory load and stores instead of using the lower-cost native WebAssembly local variables, transitions to the interpreter are zero-cost because of the shared storage arrangement.

The security policies of WebAssembly require all memory accesses to be bound-checked which increases the cost of memory loads and stores. To compensate for this overhead, Weasenly offers the alternative of special local variables on a WASM shadow stack 138. The WASM shadow stack 138 is used for temporary storage any time the WASM code uses Web Assembly locals and is used to store values during the execution of the web application. At the end of execution of a trace, the values in the WASM shadow stack 138 are spilled back into a memory spill area that is accessible by the interpreter.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
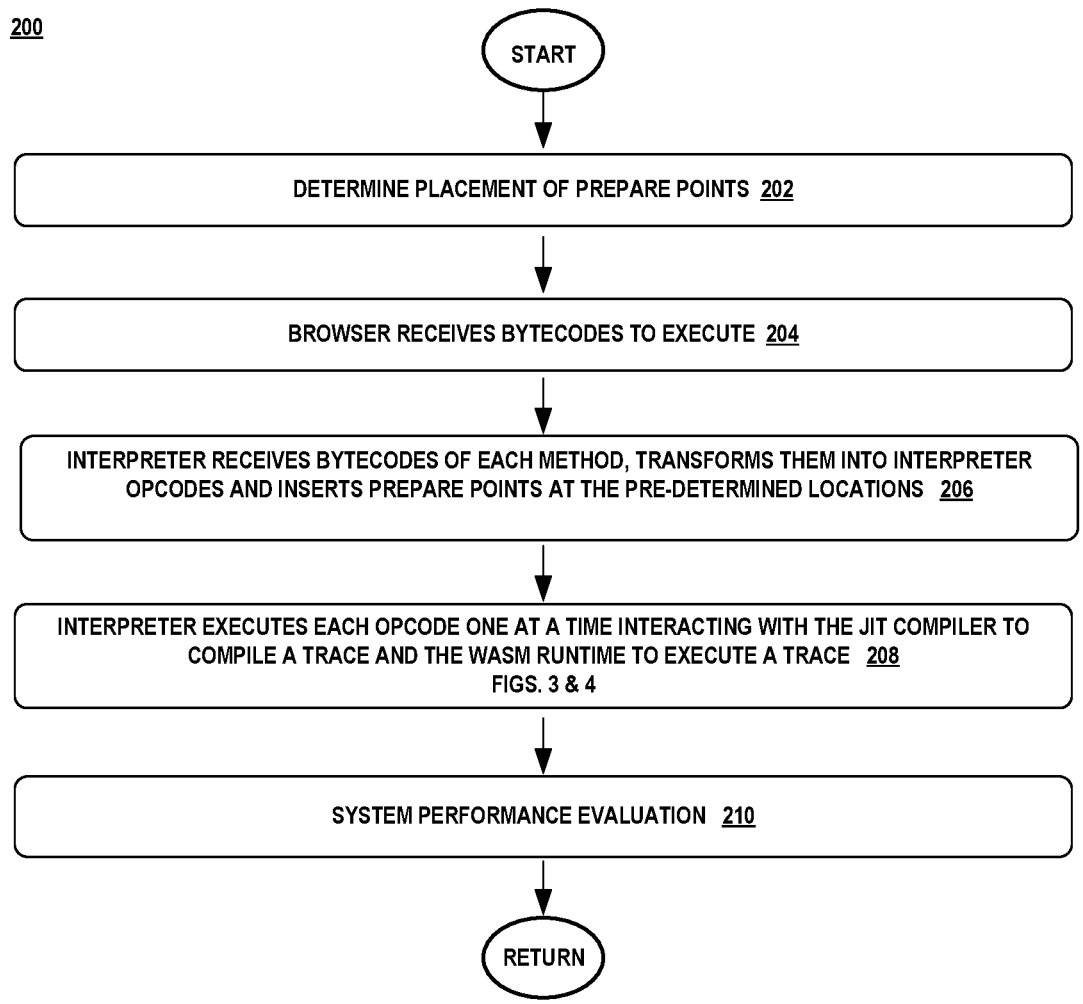
FIG. 2 is a flow diagram illustrating an exemplary method of the operations performed to execute a web application in a browser utilizing the interpreter and tracing JIT WASM compiler.

FIG. 2 illustrates an exemplary method of the system for executing bytecodes of a web application 200. Initially, the placement of the prepare_point opcodes is determined prior to execution of the interpreter and the prepare point/monitoring point thresholds are configured (block 202). A prepare_point opcode represents a location in the intermediate representation of the program. A prepare_point opcode represents a potential trace that begins with the opcode after the prepare_point opcode in the program and extends until a browser-size constraint is reached or an unknown opcode is reached. Each prepare_point opcode has a corresponding identifier which is used to uniquely identify the prepare_point opcode. Each prepare_point opcode is associated with a count which represents the frequency that the prepare_point is encountered by the interpreter. Each prepare point opcode has a corresponding threshold which represents the frequency at which the code following the prepare_point opcode should be compiled rather than interpreted. The threshold represents an estimated point at which it is more efficient to utilize the WASM code.

The tracing JIT WASM compiler is kept simple by excluding the compilation of operations with a complex behavior or which require the compiler to perform multiple passes. The prepare_point opcodes are not placed before an opcode that makes a function call, before an opcode in backward branches and loops, in opcodes that perform exception handling, or in opcodes that return a function value. Function calls require the allocation of a new stack frame, handling return values and possible exceptions making their operation complex. Backward branches and loops turn a trace into functions that may potentially run indefinitely and require the compiler to perform additional control flow analysis and management. Exception handling is not valuable to optimize. The return of a function value is about to cease execution and as such, is not worth the compilation overhead.

The prepare_point opcodes are positioned at the start of all methods with the goal of compiling the whole method if possible (block 202). However, since the WASM code runs in a web browser, the WASM code is limited to a fixed size imposed by the browser and as such, compilation of the entire method may not be possible.

The prepare_point opcodes may be positioned at the start of each basic block after a function call (block 202). A basic block is a sequence of opcodes where there is one entry into the basic block and one entry out of the basic block. In this manner, a method having a few function calls is able to execute in compiled traces. For example, a loop that has the code if (func( )) continue at the top of the loop would exit its trace at the call to func( ) but would have a prepare_point after the function call which allows most of the loop to be compiled.

In addition, a prepare_point is placed at the target of a backward branch (block 202). A backward branch occurs at the bottom of a loop before execution returns back to the top of the loop. This is done in order to capture the body of the loop.

The browser may receive a web page that hosts a web application that is made of bytecodes (e.g., .NET CIL instructions) or a web application may create a web page that is made of bytecodes (block 204). The interpreter converts each method's .NET bytecodes into interpreter opcodes and inserts the prepare_point opcodes at the target locations (block 206). The interpreter executes each opcode of the web application one opcode at a time interacting with the tracing JIT WASM compiler to compile frequently-executed opcodes into WASM code and to monitor the compilation of the opcodes (block 208). The interpreter also interacts with the WASM runtime engine to initiate execution of the WASM code and to monitor the execution of the WASM code (block 208).

The performance of the interpreter and the tracing JIT compiler is evaluated in order to improve the interpreter/compilation system (block 210). In an aspect, runtime statistics are gathered by tracking the number of bailouts and aborts that occur and the type of bailouts and aborts that occur during program execution with minimal additional cost. This analysis provides a deeper understanding of the web application's behavior and allows the interpreter and tracing JIT compiler to be tuned. Additionally, analyzing the usage counts of the prepare_point and monitoring_point opcodes is used to determine the most important opcodes and associated functions to compile.

Figure 3:
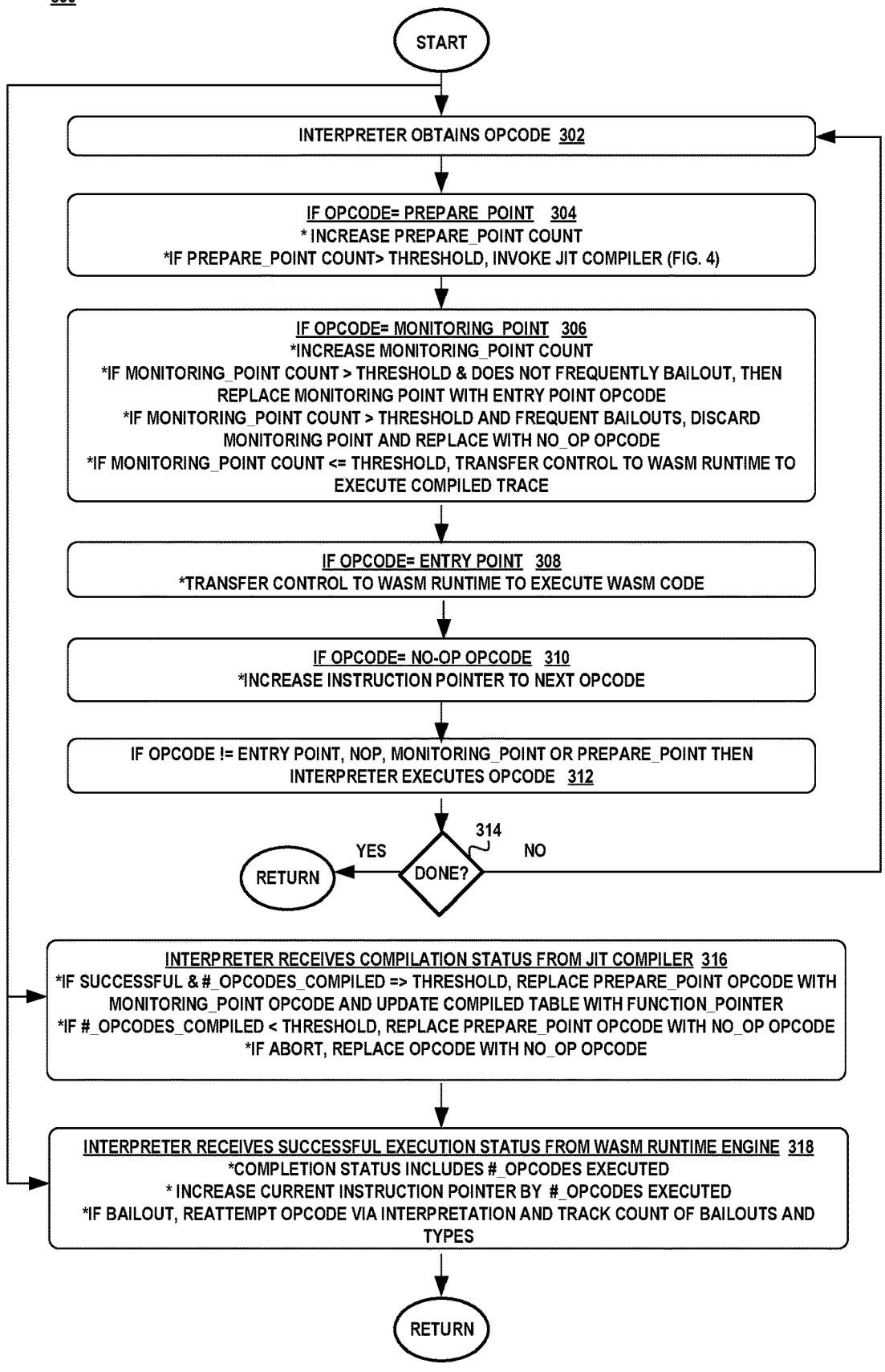
FIG. 3 is a flow diagram illustrating an exemplary method of the interpreter.

Turning to FIG. 3, there is shown an exemplary method 300 of the interpreter. Initially, the interpreter receives an interpreter opcode to execute (block 302). The interpreter checks the type of the opcode and processes the opcode based on its type accordingly.

If the opcode is a prepare_point opcode (block 304), then the corresponding prepare_point count is increased. The prepare_point count represents the number of times the prepare_point was encountered by the interpreter. When the prepare_point count exceeds a threshold value associated with the prepare_point count, then the interpreter invokes the tracing JIT WASM compiler to compile a linear sequence of interpreter opcodes (e.g., trace) into WASM code (block 304). The trace includes the WASM code for all the opcodes up until a compilation failure is encountered or an unsupported opcode is reached. The tracing JIT WASM compiler receives the prepare_point identifier and obtains a pointer to the interpreter opcodes associated with the prepare_point from the compiled code table.

When the interpreter encounters a monitoring_point opcode (block 306), the count associated with the monitoring_point is increased. The count associated with the monitoring_point represents the number of times the monitoring_point is encountered by the interpreter. When the count associated with the monitoring_point opcode is less than a threshold value, the interpreter calls the WASM runtime engine to execute the associated WASM code. The count associated with the monitoring_point opcode is stored in the compiled code table. The interpreter passes to the WASM runtime engine a function pointer associated with the WASM code which is obtained from the compiled code table and a pointer to the current interpreter stack frame.

If the count associated with the monitoring_point opcode exceeds a threshold for the monitoring_point opcode and the WASM code associated with the monitoring point executes successfully for more than a threshold value, then the interpreter invokes the WASM runtime engine to execute the WASM code associated with the monitoring point and the monitoring point is replaced with an entry_point opcode (block 306). An entry_point opcode represents a trace that has successfully executed repeatedly in the past and does not require any monitoring. The entry_point opcode includes a function pointer to the corresponding WASM code (block 306).

If the count associated with the monitoring_point opcode exceeds a threshold value for the monitoring_point opcode and there is a large number of bailouts associated with the monitoring_point opcode, then the interpreter replaces the monitoring_point opcode with a no_op opcode and discards the trace of the WASM code (block 306). A bailout is a termination of the execution of the WASM code due to a failure.

If the interpreter encounters an entry point opcode, the interpreter passes the associated function pointer and the interpreter's current state to the WASM runtime engine to execute the WASM code (block 308). If the interpreter encounters a no_op opcode, the interpreter moves to the instruction pointer to the next opcode (block 310).

If the interpreter encounters an opcode that is not a no_op opcode, a prepare_point opcode, a monitoring_point opcode, or an entry_point opcode, then the interpreter executes the opcode. The interpreter then advances the instruction pointer to the next opcode if additional opcodes exist (block 314—no) and the processing continues back to block 302. If there are no more opcodes to process (block 314—yes), then the interpreter finishes processing.

The interpreter receives notifications from the tracing JIT WASM compiler regarding the status of the compilation (block 316). If the tracing JIT WASM compiler fails to complete the compilation, the tracing JIT WASM compiler informs the interpreter of an abort condition and the interpreter interprets the opcode. In addition, the interpreter updates the abort count for the prepare_point in the compiled table and stores the execution data and type of abort (block 316). This data is used later to fine tune the threshold values and the interpreter. When the compilation executes successfully, the interpreter receives a function_pointer from the tracing JIT WASM compiler which is stored in the compiled code table (block 316).

The interpreter receives notifications from the WASM runtime engine upon completion of the execution of a trace (block 318). If the trace executed successfully, the interpreter receives a count of the number of opcodes executed. The instruction pointer is advanced by the count to the next opcode to be executed. If execution of the trace results in a bailout, the WASM runtime engine returns control to the interpreter. The interpreter logs the bailout information in the execution table and interprets the opcode that caused the bailout.

Figure 4:
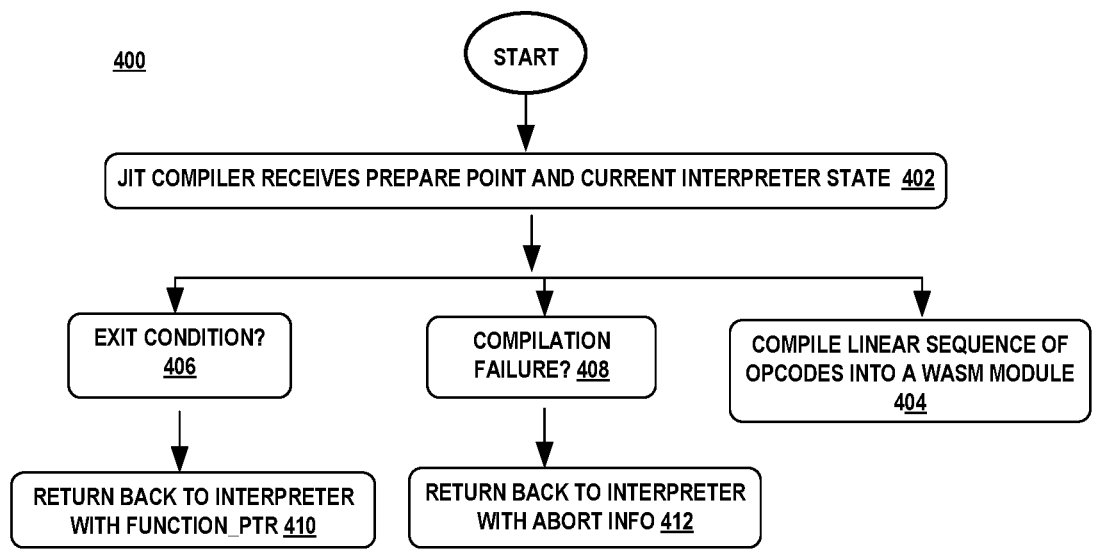
FIG. 4 is a flow diagram illustrating an exemplary method of the tracing JIT WASM compiler.

FIG. 4 illustrates an exemplary method 400 of the tracing JIT WASM compiler. The tracing JIT WASM compiler receives a prepare_point opcode from the interpreter and the current interpreter state (block 402). The current interpreter state is a pointer to the top of the interpreter stack frame. The tracing JIT WASM compiler uses the current interpreter state to find each opcode to compile and compiles a linear sequence of opcodes into a trace of WASM code (block 404) until an exit condition (block 406) or an abort condition occurs (block 408).

The tracing JIT WASM compiler creates a WASM module for the trace. The WASM module contains the definitions for functions, global variables, tables, and local variables of the trace. The module includes imports and exports. The imports are used to access state outside of the module, such as the data on the interpreter's stack frame. The exports include the trace and other internal data of the module that are accessible by other modules or the runtime.

The WASM module represents a static representation of the trace. To execute the trace, the module has to be instantiated. A module's dynamic representation is an instance complete with its mutable state. The tracing JIT WASM compiler will create an instantiation of the module with the state (i.e., tables, global variables, local variables, etc.) declared by the module. The function pointer to the module is created and returned to the interpreter. The interpreter updates the compiled code table with the function pointer. (Collectively, block 404).

In the event of an exit condition, the tracing JIT WASM compiler returns control back to the interpreter (block 414). An exit condition occurs when an unsupported opcode is reached, a calling function is reached, or a return from a function is reached. The tracing JIT WASM compiler returns the function pointer to the instantiated module to the interpreter which in turn stores the function pointer in the compiled code table.

In the event the compilation experiences an execution failure (block 408) control returns back to the interpreter (block 416). The interpreter executes the failed opcodes and records the abort failure in the compiled code table.

Technical Effect/Technical Improvement

Aspects of the subject matter disclosed herein pertain to a mixed mode of executing bytecodes of a web application in a browser efficiently where less-frequently executed opcodes are interpreted and frequently-executed opcodes are compiled into a compacted-form that executes faster than the interpreted opcodes. The technical features associated with addressing this problem is the detection of the traces that can be successfully compiled and executed with minimal resource consumption and impact on the execution time of the web application. The technical effect achieved is the ability to expeditiously test and debug the web application without having to incur the build and AOT compilation overhead of the WASM code repeatedly at each debugging pass. In addition, the sharing of the interpreter's current state between the interpreter and the JIT WASM compiler improves the functioning of the computer without undue increased computational burden.

In one or more embodiments, the interpreter and JIT WASM compiler operate in a high-volume environment where a web application may utilize a .NET application consisting of hundreds or thousands of bytecodes. In order to execute this number of bytecodes within the timing demands of the users and within the resource constraints of the browser, the operations performed by the interpreter, JIT WASM compiler, the WASM runtime and the browser need to be performed on a computing device.

Furthermore, these operations are inherently digital. A human mind cannot interface directly with a CPU, or network interface card, or other processor, or with RAM or digital storage, to read and write the necessary data and perform the necessary operations and other data processing steps taught herein.

Embodiments are also presumed to be capable of operating at scale in production environments or in testing labs for production environments as opposed to being mere thought experiments.

The technique described herein is a technical improvement over prior solutions. The prior solutions incurred a significant amount of overhead and computing time to transform bytecodes into WASM code and then compile the WASM code into native machine code. The claimed technique interprets less frequently-used interpreter opcodes and executes WASM code which is a compact binary code that executes quickly. The execution of the opcodes and WASM code avoids the large build and compilation overhead of the prior solutions.

Exemplary Operating Environment

Figure 5:
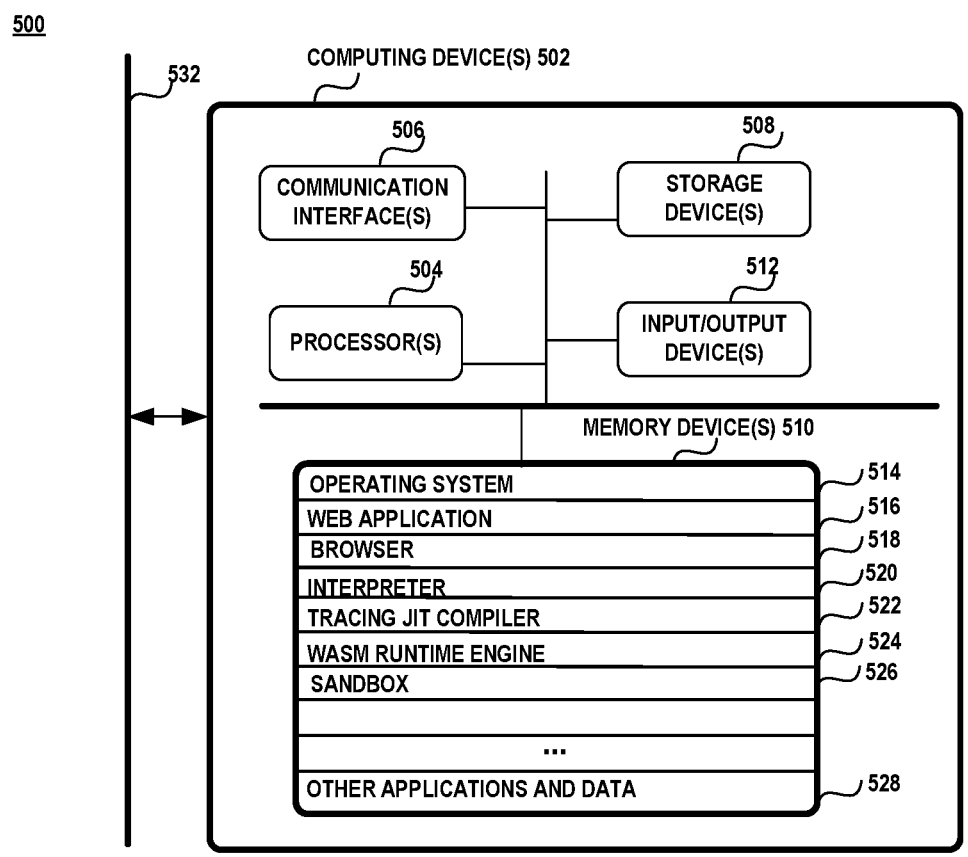
FIG. 5 is a block diagram illustrating an exemplary operating environment.

Attention now turns to a discussion of an exemplary operating environment 500. FIG. 5 illustrates an exemplary operating environment 500 having one or more computing devices 502 communicatively coupled to a network 532.

The computing devices 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 500 may be configured in a network environment, a distributed environment, a multi-processor environment, or a stand-alone computing device having access to remote or local storage devices.

A computing device 502 may include one or more processors 504, one or more communication interfaces 506, one or more storage devices 508, one or more input/output devices 512, and one or more memory devices 510. A processor 504 may be any commercially available or customized processor and may include dual microprocessors and multi-processor architectures. A communication interface 506 facilitates wired or wireless communications between the computing device 502 and other devices. A storage device 508 may be computer-readable medium that does not contain propagating signals, such as modulated data signals transmitted through a carrier wave. Examples of a storage device 508 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 508 in a computing device 502. The input/output devices 512 may include a keyboard, mouse, pen, voice input device, touch input device, display, speakers, printers, etc., and any combination thereof.

A memory device 510 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 510 may also include one or more external storage devices or remotely located storage devices that do not pertain to propagated signals, such as modulated data signals transmitted through a carrier wave.

The memory device 510 may contain instructions, components, and data. A component is a software program that performs a specific function and is otherwise known as a module, program, component, and/or application. The memory device 510 may include an operating system 514, a web application 516, a browser 518, an interpreter 520, a tracing JIT compiler 522, a WASM runtime engine 524, a sandbox 526, and other applications and data 528.

The computing device 502 may be communicatively coupled via a network 532. The network 532 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 532 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed comprising: one or more processors; and a memory that stores an interpreter and a tracing Just-In-Time (JIT) WebAssembly (WASM) compiler that are configured to be executed by the one or more processors within a web browser in a sandbox execution environment. The interpreter includes instructions that perform acts to: obtain a plurality of opcodes of a web application to execute; insert at least one prepare point opcode in a select location of the plurality of opcodes; upon execution of the at least one prepares point opcode for more than a first threshold value, invoke the tracing JIT WASM compiler to transform a linear sequence of the plurality of interpreter opcodes into WASM code; upon successful compilation of the linear sequence of the plurality of interpreter opcodes into WASM code, replace the at least one prepare point opcode into a monitoring point opcode, wherein the monitoring point opcode is associated with the WASM code; and upon execution of the monitoring point opcode, initiate execution of the WASM code in a WASM runtime.

In an aspect, the interpreter includes instructions that perform acts to: track execution status of the monitoring point opcode; and upon the WASM code failing to execute successfully for more than a second threshold value, discard the monitoring point opcode and resume interpretation of the opcodes associated with the monitoring point opcode.

In an aspect, the interpreter includes instructions that perform acts to: upon successful execution of the WASM code for more than a third threshold value, replace the monitoring point opcode with an entry point opcode. In an aspect, the interpreter includes instructions that perform acts to: upon execution of the entry point opcode, initiate execution of the WASM code without monitoring execution frequency of the WASM code. In an aspect, the interpreter includes instructions that perform acts to: insert the at least one prepare point at a beginning of a method, start of basic block after a function call or at target of a backward branch.

In an aspect, the interpreter includes instructions that perform acts to: upon the linear sequence of the plurality of interpreter opcodes failing to compile into WASM code, replace the prepare point with no_op opcode. In an aspect, the JIT compiler includes instructions that perform acts to: compile the linear sequence of the plurality of interpreter opcodes until an unsupported opcode is reached. In an aspect, the interpreter includes instructions that perform acts to: recognize an execution failure during execution of the WASM code for a failed opcode; and return control back to the interpreter.

A computer-implemented method of an interpreter is disclosed, comprising: obtaining within a browser, a plurality of interpreter opcodes associated with a web application, wherein the browser includes the interpreter and a tracing Just-in-Time (JIT) WebAssembly (WASM) compiler; executing each of the plurality of interpreter opcodes; tracking execution of a select one of the plurality of interpreter opcodes; upon the execution of the select one of the plurality of interpreter opcodes exceeding a first threshold value, invoking the tracing JIT WASM compiler to compile a sequence of the plurality of interpreter opcodes starting immediately after the select one of the plurality of interpreter opcodes into WASM code; and upon successful compilation of the sequence of the plurality of interpreter opcodes, invoking a WASM runtime engine to execute the WASM code.

In an aspect, the computer-implemented method further comprises: upon the WASM code failing to successfully execute more than a second threshold value, discarding the WASM code and interpreting the interpreter opcodes associated with the discarded WASM code. In an aspect, the select one of the plurality of interpreter opcodes is positioned at a start of a method, at a start of basic block after a function call and/or at a target of a backward branch. In an aspect, the computer-implemented method further comprising: upon unsuccessful compilation of the sequence of the plurality of interpreter opcodes, stopping the tracking of the select one of the plurality of interpreter opcodes.

In an aspect, the computer-implemented method further comprises: compiling, by the tracing JIT WASM compiler, interpreter opcodes starting immediately after the select one of the plurality of interpreter opcodes until an unsupported opcode is reached. In an aspect, the computer-implemented method, further comprises: operating the interpreter and the JIT compiler in a sandbox execution environment; and the interpreter and the JIT compiler share data of an interpreter stack frame.

In an aspect, the computer-implemented method, further comprises: receiving in the browser, bytecodes of a web application; and transforming the bytecodes of a web application into the plurality of interpreter opcodes, wherein the bytecodes of the web application differ from the interpreter opcodes.

One or more hardware storage devices are disclosed having stored thereon computer executable instructions that are structured to be executable by one or more processors of a computing device to thereby cause the computing device to performing actions that: configure a sandbox execution environment in a web browser, wherein an interpreter and a tracing Just-in-Time (JIT) WebAssembly (WASM) compiler execute within the sandbox execution environment; receive a plurality of interpreter opcodes of a web application to execute, wherein at least one of the plurality of interpreter opcodes including a prepare_point opcode; upon execution of the prepare_point opcode by the interpreter for over a threshold value, initiate the tracing JIT WASM compiler to compile a trace, wherein the trace includes WASM code for a linear sequence of the plurality of interpreter opcodes starting from a location of the prepare_point opcode until an unsupported opcode is reached; replace the prepare point opcode with a monitoring point opcode; and upon execution of the monitoring point opcode, initiate execution of the trace in a WASM runtime environment.

In an aspect, the one or more hardware storage devices have computer executable instructions that perform actions that: track execution status of the monitoring point opcode; and upon the trace failing to execute successfully for more than a second threshold value, discard the monitoring point opcode and the trace.

In an aspect, the one or more hardware storage devices have computer executable instructions that perform actions that: upon successful execution of the WASM code for more than a third threshold value, replace the monitoring point opcode with an entry point opcode.

In an aspect, the one or more hardware storage devices of claim 18, having computer executable instructions that perform actions that: upon execution of the entry point opcode, initiate execution of the WASM code without monitoring execution frequency of the WASM code.

In an aspect, the one or more hardware storage devices of claim 16, having computer executable instructions that perform actions that: insert the at least one prepare point at a beginning of a method, start of basic block after a function call or at target of a backward branch of the web application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:
1. A system comprising:
one or more processors; and
a memory that stores an interpreter and a tracing Just-In-Time (JIT) WebAssembly (WASM) compiler that are configured to be executed by the one or more processors within a web browser in a sandbox execution environment,
wherein the interpreter includes instructions that perform acts to:
obtain a plurality of interpreter opcodes of a web application to execute;
insert at least one prepare point opcode in a select location of the plurality of interpreter opcodes;
upon execution of the at least one prepare point opcode for more than a first threshold value, invoke the tracing JIT WASM compiler to transform a linear sequence of the plurality of interpreter opcodes into WASM code;

upon successful compilation of the linear sequence of the plurality of interpreter opcodes into WASM code, replace the at least one prepare point opcode into a monitoring point opcode, wherein the monitoring point opcode is associated with the WASM code;

upon execution of the monitoring point opcode, initiate execution of the WASM code in a WASM runtime and monitor execution frequency of the monitoring point opcode; and upon successful execution of the WASM code for more than a third threshold value, replace the monitoring point opcode with an entry point opcode.

2. The system of claim 1, wherein the interpreter includes instructions that perform acts to:

track execution status of the monitoring point opcode; and
upon the WASM code failing to execute successfully for more than a second threshold value, discard the monitoring point opcode and resume interpretation of the opcodes associated with the monitoring point opcode.

3. The system of claim 1, wherein the interpreter includes instructions that perform acts to:

receive in the browser, bytecodes of a web application; and
transform the bytecodes of the web application into the plurality of interpreter opcodes, wherein the bytecodes of the web application differ from the interpreter opcodes.

4. The system of claim 1, wherein the interpreter includes instructions that perform acts to:

upon execution of the entry point opcode, initiate execution of the WASM code without monitoring execution frequency of the WASM code.

5. The system of claim 1, wherein the interpreter includes instructions that perform acts to:

insert the at least one prepare point at a beginning of a method, start of basic block after a function call or at target of a backward branch.

6. The system of claim 1, wherein the interpreter includes instructions that perform acts to:

upon the linear sequence of the plurality of interpreter opcodes failing to compile into WASM code, replace the prepare point opcode with no_op opcode.

7. The system of claim 1, wherein the JIT WASM compiler includes instructions that perform acts to: compile the linear sequence of the plurality of interpreter opcodes until an unsupported opcode is reached.

8. The system of claim 1,
wherein the interpreter includes instructions that perform acts to: recognize an execution failure during execution of the WASM code for a failed opcode; and return control back to the interpreter.

9. A computer-implemented method of an interpreter, comprising:

obtaining within a browser, a plurality of interpreter opcodes associated with a web application, wherein the browser includes the interpreter and a tracing Just-in-Time (JIT) WebAssembly (WASM) compiler;
executing each of the plurality of interpreter opcodes;
tracking execution of a select one of the plurality of interpreter opcodes, wherein the select one of the plurality of interpreter opcodes comprises a prepare point opcode;
upon the execution of the prepare point opcode exceeding a first threshold value, invoking the tracing JIT WASM compiler to compile a sequence of the plurality of interpreter opcodes starting immediately after the prepare point opcode into WASM code;

upon successful compilation of the sequence of the plurality of interpreter opcodes, replacing the prepare point opcode into a monitoring point opcode, wherein the monitoring point opcode is associated with the WASM code;

upon execution of the monitoring point opcode, initiating execution of the WASM code in a WASM runtime and monitoring execution frequency of the monitoring point opcode; and upon successful execution of the WASM code for more than a third threshold value, replacing the monitoring point opcode with an entry point opcode.

10. The computer-implemented method of claim 9, further comprising:

upon the WASM code failing to successfully execute more than a second threshold value, discarding the WASM code and interpreting the interpreter opcodes associated with the discarded WASM code.

11. The computer-implemented method of claim 9, wherein the select one of the plurality of interpreter opcodes is positioned at a start of a method, at a start of basic block after a function call and/or at a target of a backward branch.

12. The computer-implemented method of claim 9, further comprising:

upon unsuccessful compilation of the sequence of the plurality of interpreter opcodes, stopping the tracking of the select one of the plurality of interpreter opcodes.

13. The computer-implemented method of claim 9, further comprising:

compiling, by the tracing JIT WASM compiler, interpreter opcodes starting immediately after the select one of the plurality of interpreter opcodes until an unsupported opcode is reached.

14. The computer-implemented method of claim 9, further comprising:

operating the interpreter and the JIT compiler in a sandbox execution environment; and
wherein the interpreter and the JIT compiler share data of an interpreter stack frame.

15. The computer-implemented method of claim 9, further comprising:

receiving in the browser, bytecodes of a web application; and
transforming the bytecodes of the web application into the plurality of interpreter opcodes, wherein the bytecodes of the web application differ from the interpreter opcodes.

16. One or more hardware storage devices having stored thereon computer executable instructions that are structured to be executable by one or more processors of a computing device to thereby cause the computing device to performing actions that:

configure a sandbox execution environment in a web browser, wherein an interpreter and a tracing Just-in-Time (JIT) WebAssembly (WASM) compiler execute within the sandbox execution environment;
receive a plurality of interpreter opcodes of a web application to execute, wherein at least one of the plurality of interpreter opcodes including a prepare point opcode;
upon execution of the prepare point opcode by the interpreter for over a threshold value, initiate the tracing JIT WASM compiler to compile a trace, wherein the trace includes WASM code for a linear sequence of the plurality of interpreter opcodes starting from a location of the prepare point opcode until an unsupported opcode is reached;

replace the prepare point opcode with a monitoring point opcode;

upon execution of the monitoring point opcode, initiate execution of the trace in a WASM runtime environment and monitor execution frequency of the monitoring point opcode; and upon successful execution of the trace in the WASM runtime environment for more than a third threshold value, replace the monitoring point opcode with an entry point opcode.

17. The one or more hardware storage devices of claim 16, having computer executable instructions that perform actions that:

track execution status of the monitoring point opcode; and upon the trace failing to execute successfully for more than a second threshold value, discard the monitoring point opcode and the trace.

18. The one or more hardware storage devices of claim 16, having computer executable instructions that perform actions that:

track execution status of the monitoring point opcode; and upon the WASM code failing to execute successfully for more than a second threshold value, discard the monitoring point opcode and resume interpretation of the opcodes associated with the monitoring point opcode.

19. The one or more hardware storage devices of claim 18, having computer executable instructions that perform actions that:

upon execution of the entry point opcode, initiate execution of the WASM code without monitoring execution frequency of the WASM code.

20. The one or more hardware storage devices of claim 16, having computer executable instructions that perform actions that:

insert the at least one prepare point at a beginning of a method, start of basic block after a function call or at target of a backward branch of the web application.

* * * * *